United States Patent [19]

Karim et al.

[11] 4,288,572

[45] Sep. 8, 1981

[54] BLENDS OF ETHYLENE-ALKYL ACRYLATE COPOLYMERS WITH CERTAIN POLYESTERS

[75] Inventors: Khalid A. Karim; James H. Rea, both of Houston, Tex.

[73] Assignee: Gulf Oil Corporation, Pittsburgh, Pa.

[21] Appl. No.: 172,595

[22] Filed: Jul. 28, 1980

[51] Int. Cl.³ .................... C08L 67/02; C08L 23/08
[52] U.S. Cl. .................................................... 525/176
[58] Field of Search ......................................... 525/176

[56] References Cited

U.S. PATENT DOCUMENTS 3,867,324  2/1975  Clendinning et al. .............. 525/186
3,901,838  8/1975  Clendinning et al. .............. 525/177

Primary Examiner—Carman J. Seccuro
Attorney, Agent, or Firm—Richard L. Kelly

[57] ABSTRACT

A compatible blend of polymers is disclosed and consists essentially of 100 parts by weight of an ethylene-alkyl acrylate copolymer and about 0.2 to 3 parts by weight of either poly(ethylene adipate) or poly(trimethylene adipate). The polymer blends have a lower sealing temperature than the ethylene-alkyl acrylate copolymer contained therein.

11 Claims, No Drawings

BLENDS OF ETHYLENE-ALKYL ACRYLATE COPOLYMERS WITH CERTAIN POLYESTERS

BACKGROUND OF THE INVENTION

Ethylene-alkyl acrylate copolymers are widely employed in the manufacture of polymer films. In preparing bags, pouches, and the like from such films, the films are heat sealed together under pressure. It would be desirable to seal such films together at lower temperatures than are presently required with ethylene-alkyl acrylate copolymers.

SUMMARY OF THE INVENTION

The applicants have discovered that blends of ethylene-alkyl acrylate copolymers with minor quantities of either poly(ethylene adipate) or poly(trimethylene adipate) are compatible and melt at lower temperatures than the ethylene-alkyl acrylate copolymers. As a consequence, films prepared from such polymer blends can be heat sealed at significantly lower temperatures than those required to heat seal films of the ethylene-alkyl acrylate copolymers contained in such blends.

DETAILED DESCRIPTION OF THE INVENTION

The polymer blends of the invention consists essentially of 100 parts by weight of the ethylene-alkyl acrylate copolymer and about 0.2 to 3, preferably about 1 to 2.5, and more especially about 2 parts by weight of the poly(ethylene adipate) or poly(trimethylene adipate). The polymer blends can be prepared by any of the common techniques employed in the art to prepare blends of two polymers. This conventionally is done by malaxating the polymers on a two-roll rubber mill, or in Banbury mixers, or by extruding the mixture, or by other like techniques.

The ethylene copolymers included in the blends have polymerized therein about 70 to 98, preferably about 78-83, and more especially about 80 weight % of ethylene, with the balance of the copolymer being an alkyl ester of acrylic or methacrylic acid. The alkyl group of the acrylic or methacrylic acid ester may contain from about 1 to 18 carbon atoms, with the preferred esters being the methyl and the ethyl esters. Such copolymers can be prepared by known methods as disclosed, for example, in U.S. Pat. No. 3,350,372, the disclosure of which is incorporated hrein by reference.

The poly(ethylene adipate) and poly(trimethylene adipate) employed in the invention can be prepared by techniques known and reported in the art. Such polyesters can be prepared by a simple esterification of adipic acid with either ethylene glycol or trimethylene glycol (1,3-propylene glycol in alternate nomenclature). In such esterifications, after the polymerization has been carried to the point of producing low molecular weight polymers, the further esterification and polymerization are carried out by heating the reaction mixture under reduced pressure to aid in removing water. Alternatively, the polyesters can be prepared by a transesterification technique in which a lower ester of adipic acid, such as dimethyl adipate, is transesterified with ethylene glycol or trimethylene glycol.

The molecular weight of the poly(ethylene adipate) and the poly(trimethylene adipate) has an effect upon the compatibility of such polyesters with the ethylene copolymers. In general, the higher the molecular weight of the polyester, the larger the quantity of polyester that can be incorporated into the ethylene-alkyl acrylate copolymer without exudation occurring. It is noted, however, that as the molecular weight of the polyester increases, the effect of the polyester in lowering the seal temperature of the polymer blend decreases. Accordingly, the applicants prefer to employ polyesters having molecular weights in a range from as low as approximately 300 to the order of about 3,000.

All of the polymer blends employed in the work subsequently reported were prepared by adding comminuted polymers to a Barbender Plasticorder operated at approximately 130° C. and 40 rpm. The mixing time was 20 minutes in all cases. Films of each blend having a range of thickness of 2–4 mils were compression molded in a press. Tensile and elongation values were measured for each film.

The films were cut into 1"×2" strips and heat sealed at different temperatures over a range from 150° F. to 250° F. to minimize errors and improve reproducibility, a set of at least three films was sealed at each temperature. The seal strength at each temperature was measured by pulling the samples to the break point in an Instrom Tester. Plots of Seal Strength (in lbs/inch) vs. Seal Temperature in °F. were made for each polymer blend and the ethylene-alkyl acrylate copolymer contained therein. The Seal Temperature required to obtain a Seal Strength of 2.75 lbs/inch was noted for each sample.

The following examples are set forth to illustrate more clearly the principle and practice of the invention to those skilled in the art. Where parts or percentages are mentioned, they are parts or percentages on a weight basis unless otherwise noted.

EXAMPLE 1

A polymer blend was prepared from 98 parts of a commercially available ethylene-methyl acrylate copolymer having a melt index of 2.4 and containing 20 weight % of the methyl acrylate moiety and 2 parts of poly(ethylene adipate). The ethylene-methyl acrylate copolymer had a tensile strength of 1,900 lbs/psi and an elongation at break of 637%. The poly(ethylene adipate) was purchased from a specialty laboratory supply house and had a glass transition temperature of −50° C., a melting temperature of 55° C., a density of 1.183, and a molecular weight of approximately 1,000. The blend prepared from the two polymers had a tensile strength of 2,100 psi and an elongation at break of 647%.

Following the experimental procedures previously described, the seal strength of the polymer blend and the ethylene-methyl acrylate copolymer were determined at sealing temperatures from 150° to 250° F. With the ethylene-methylene acrylate copolymer, a seal temperature of approximately 220° F. was required to obtain a seal strength of approximately 220° F. was required to obtain a seal strength of 2.75 lbs/inch. With the polymer blend, a seal strength of 2.75 lbs/inch was obtained at a seal temperature of approximately 185° F. It is thus seen that the polymer blend has a seal temperature approximately 35° F. lower than the seal temperature of the ethylene-methyl acrylate copolymer contained therein.

EXAMPLE 2

Part A

Example 1 was repeated, except that the poly(ethylene adipate) of Example 1 was replaced with a poly(trimethylene adipate) sample which had a molecular weight of approximately 300. The polymer blend had a tensile strength of 2,100 psi and an elongation at break of 600%. The polymer blend had a seal strength of 2.75 lbs/inch at a temperature of 190° F., which is approximately 30° lower than the corresponding seal temperature of the ethylene-methyl acrylate copolymer contained in the polymer blend.

Part B

Part A above was repeated, except that the proportions of the blend were adjusted to provide 99 parts of the ethylene-methyl acrylate copolymer and one part of the poly(trimethylene adipate). A seal strength of 2.75 lbs/inch was obtained at a temperature of about 205° F., which is about 15° F. lower than the seal temperature of the ethylene-methyl acrylate copolymer contained in the polymer blend.

In preparing plots of Seal Strength vs. Seal Temperature as previously described, it is noted that the curves for the polymer blends of the invention rise less steeply than do the curves for the ethylene-alkyl acrylate copolymers. As a consequence, effective heat seals can be obtained over a relatively wide range of sealing temperatures. This characteristic makes temperature control of the heat sealer less critical than is the case with other types of ethylene polymers.

In addition to being useful in the direct manufacture of film, the polymer blends of the invention can be used as one component in the manufacture of the multilayered coextruded film. Usually the polymer blend will be employed as a surface component to take advantage of its good heat sealing characteristics.

What is claimed:

1. A compatible blend of polymers consisting essentially of:
   (a) 100 parts by weight of an ethylene copolymer, and
   (b) About 0.2 to 3 parts by weight of a polyester resin; said ethylene copolymer having polymerized therein about 70 to 98 weight % of ethylene and the balance an alkyl ester of acrylic or methacrylic acid; said polyester being poly(ethylene adipate) or poly(trimethylene adipate).

2. A composition of claim 1 containing 100 parts by weight of the ethylene copolymer and about 1 to 25 parts by weight of the polyester.

3. A composition of claim 1 in which the ethylene copolymer has polymerized therein about 78–83 weight % of ethylene and the balance methyl acrylate.

4. A composition of claim 2 in which the ethylene copolymer has polymerized therein about 78–83 weight % of ethylene and the balance methyl acrylate.

5. A composition of claim 1, 2, 3, or 4 in which the polyester is poly(ethylene adipate).

6. A composition of claim 1, 2, 3, or 4 in which the polyester is poly(trimethylene adipate).

7. A method for lowering the seal temperature of a film of an ethylene copolymer having polymerized therein about 70 to 98 weight % of ethylene and the balance an alkyl ester of acrylic or methacrylic acid which consists essentially of uniformly dispersing about 0.2 to 3 parts by weight of poly(ethylene adipate) or poly(trimethylene adipate) in 100 parts by weight of said ethylene copolymer.

8. The method of claim 7 in which about 1 to 2.5 parts of the poly(ethylene adipate) or poly(trimethylene adipate) are dispersed in the ethylene copolymer.

9. The method of claim 7 in which the ethylene copolymer has polymerized therein about 78–83 weight % of ethylene and the balance methyl acrylate.

10. The method of claim 8 in which the ethylene copolymer has polymerized therein about 78–83 weight % of ethylene and the balance methyl acrylate.

11. A film of a polymer blend of claim 1, 2, 3, or 4.

* * * * *